United States Patent [19]

Matsukawa

[11] Patent Number: 5,574,522
[45] Date of Patent: Nov. 12, 1996

[54] CAMERA

[75] Inventor: Nobuo Matsukawa, Tokyo, Japan

[73] Assignee: Nikon Coporation, Tokyo, Japan

[21] Appl. No.: 358,383

[22] Filed: Dec. 19, 1994

[30] Foreign Application Priority Data

Dec. 30, 1993 [JP] Japan .................................. 5-354440
May 13, 1994 [JP] Japan .................................. 6-099932

[51] Int. Cl.$^6$ .......................... G03B 19/12; G03B 1/18; G03B 9/08
[52] U.S. Cl. .......................... 396/411; 396/418; 396/358; 396/502
[58] Field of Search ................................ 354/152, 234.1, 354/173.1, 457

[56] References Cited

U.S. PATENT DOCUMENTS

| | | | |
|---|---|---|---|
| 4,334,749 | 6/1982 | Saito et al. | 354/234 |
| 4,350,423 | 9/1982 | Engelsmann et al. | 310/328 |
| 4,935,659 | 6/1990 | Naka et al. | 310/328 |
| 5,130,728 | 7/1992 | Goto et al. | 354/105 |
| 5,142,313 | 8/1992 | Haraguchi et al. | 354/173.1 |

FOREIGN PATENT DOCUMENTS 2-21636  2/1990  Japan .
5-28809  4/1993  Japan .

Primary Examiner—Michael L. Gellner
Assistant Examiner—Daniel Chapik
Attorney, Agent, or Firm—Oliff & Berridge

[57] ABSTRACT

In order to reduce the width of an electric camera to the largest extent possible, and to improve operations in the camera, the driving motor that drives the shutter activating mechanism is a flat motor situated either above or below the spool chamber or the cartridge chamber. Additionally, to provide a camera that can be miniaturized, and with which noise and vibration are minimized, a motor device that drives at least one of a mirror device that drives a mirror at the time of exposure of the film and a shutter device that regulates the exposure time interval of the film, is arranged relative to the film cartridge chamber so that the spindle of the cartridge chamber and the shaft of the motor are substantially coaxial.

28 Claims, 15 Drawing Sheets

CAMERA

BACKGROUND OF THE INVENTION

1. Field of the Invention

The present invention relates to a camera, and, in particular, to a camera that drives a-shutter device, a mirror device, a film winding/rewinding device and the like with a motor.

2. Description of Related Art

Electric cameras are widely used in which the shutter driving mechanism, the mirror device and/or the film winding/rewinding mechanism are driven by a small direct current motor that uses a permanent magnet. As shown in FIGS. 12 and 13, the driving motor 61 used in the electric camera 60 uses a deceleration system 62 (e.g., a gear reduction system) between the motor 61 and the driven mechanisms, the motor being characterized by properties of high rotation speed and low torque. The deceleration system 62 shown in FIGS. 12 and 13 is used for the purpose of shutter driving. The driving motor 61 and deceleration system 62 are generally provided near the grip 63 of the camera.

In addition, a large capacity condenser 64 (e.g., a capacitor) has been required in recent cameras because of built-in strobes that produce large amounts of light. However, because a large capacity condenser 64 requires a large amount of space, such a condenser is generally provided near the grip 63, where there is a relatively large amount of free space.

However, the width of the electric camera 60 is made larger because of the driving motor 61, the deceleration system 62 and the condenser 64, and the camera's ability to operate also tends to deteriorate.

Additionally, the space that is required in order to position the speed-reduction devices such as gears limits the miniaturization of the camera.

In addition, noise and vibration are generated when the speed-reduction device operates.

SUMMARY OF THE INVENTION

In light of the above, it is an object of the present invention to reduce the width of an electric camera to the maximum extent, while also improving camera operability.

In order to achieve the above and other objects, one aspect of the present invention places a flat motor that is used to drive the shutter mechanism adjacent to one end of either the cartridge chamber or the spool chamber of the camera.

In an electric camera having the described structure, the electric motor is comprised of a flat motor, provided either above or below the spool chamber or the cartridge chamber. Consequently, it is possible to place a large capacity condenser in the space traditionally occupied by the driving motor. By this means, the width of the electric camera can be reduced to the maximum extent, thereby enhancing camera operability.

According to another aspect of the present invention, a driving motor that drives at least one of a mirror device (which drives a quick return mirror when the film is exposed) and a shutter device (which regulates the exposure time interval of the film) is located with respect to the film cartridge chamber of the camera such that the spindle (or central axis) of the cartridge chamber and the shaft (i.e., the central axis) of the driving motor are substantially coaxial.

In one preferred embodiment, the motor is positioned at the bottom of the film cartridge chamber. Additionally with one preferred embodiment, the shaft of the motor is hollow. The motor can be an ultrasonic wave motor having a fixed element comprising an elastic component and a piezoelectric component attached to the elastic component, and a rotating element that is pressed into contact with the fixed element.

Another motor can be provided for feeding the film. A transmitting component is linked between the film-feeding motor and the film cartridge chamber to transmit the driving power of the film-feeding motor to the cartridge chamber. A portion of the transmitting component extends at least partially into the hollow shaft of the motor positioned at the bottom of the cartridge chamber.

The positioning of the motor enables space inside the camera to be utilized more efficiently, thereby facilitating miniaturization. Additionally, when an ultrasonic wave motor is used as the motor device, speed-reduction mechanisms such as gears or the like are not necessary because large-torque can be obtained at low-speed revolutions. The space inside the camera can thus be utilized more efficiently, minimizing noise and vibration.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Hereinafter, preferred embodiments of the present invention are described with reference to the drawings.

Figure 1:
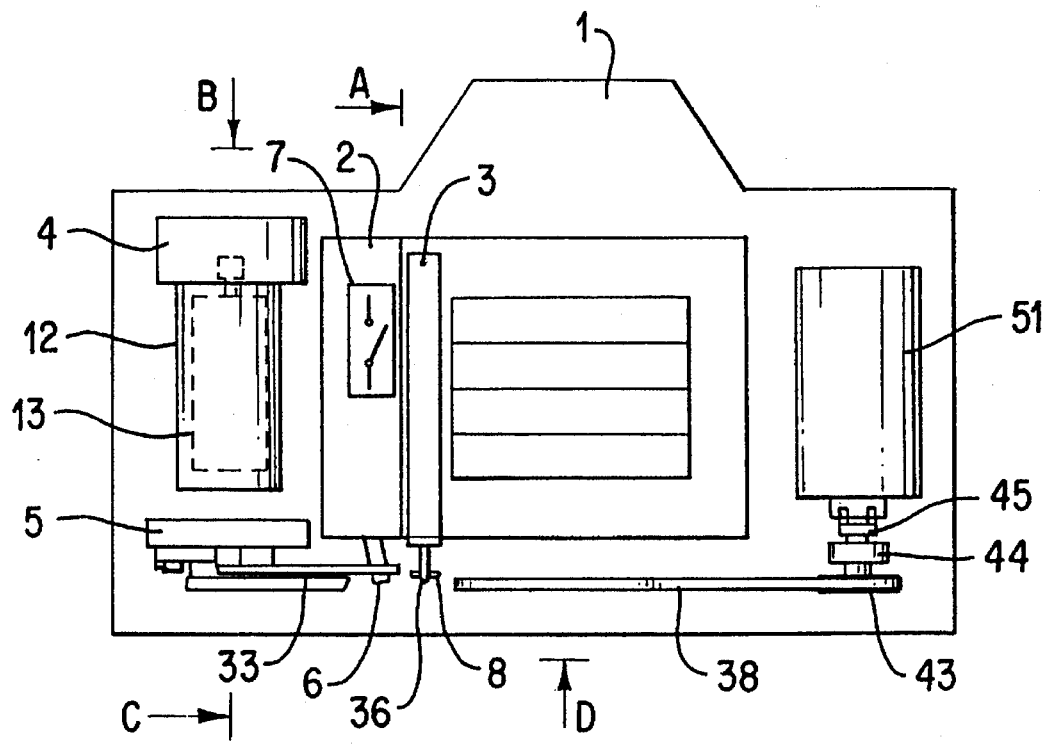
FIG. 1 is a front view of a camera according to an embodiment of the present invention.

FIG. 1 is a front view showing an embodiment of the electric camera according to the present invention.

In FIG. 1, the camera 1 contains a shutter 2, a mirror mechanism 3 (which can be for a quick-return mirror), a film winding mechanism 4 and a shutter motor 5 that comprises the drive source for shutter driving. The shutter motor 5 is comprised of an ultrasonic motor, a deceleration system not being provided because of the low speed rotation and high torque that is characteristic of such a motor. Accordingly, the ultrasonic motor can directly drive the film winding mechanism 4 and drive the shutter and in addition has the property of producing little noise during operation.

The left end (in FIG. 1) of the camera 1 is a spool chamber that houses a spool 12. The shutter 2 includes a shutter lever 6 that is driven to the left in FIG. 1 by a shutter drive lever 33, as is explained hereinafter. The driven shutter 2 conducts an exposure action under the operation of an unrepresented electromagnet using a release signal as a trigger. In addition, an exposure completion switch 7 is also provided, the switch 7 producing a signal in accordance with the completion of the action of the shutter. The mirror mechanism 3 contains a mirror lever 8 that is described hereinafter, and is driven by a mirror drive lever 36.

Figure 6:
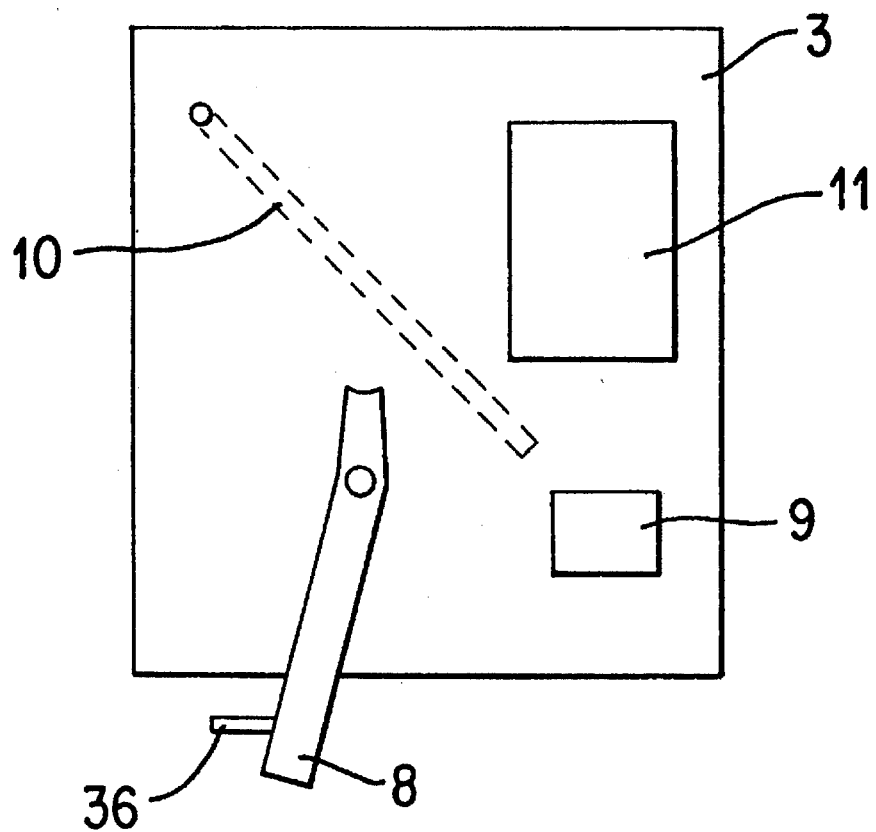
FIG. 6 is a side view of the camera quick-return mirror.

FIG. 6 shows the mirror mechanism 3, and is a view as seen from the side in the direction indicated by arrow A in FIG. 1. The mirror lever 8 is driven to the right in the drawing by a mirror drive lever 36. The driven mirror mechanism 3 raises the mirror 10 under the operation of a release magnet 9, using a release signal as the trigger, and the action of a diaphragm control mechanism for the mounted lens (not shown in the drawing) is also executed.

Figure 2:
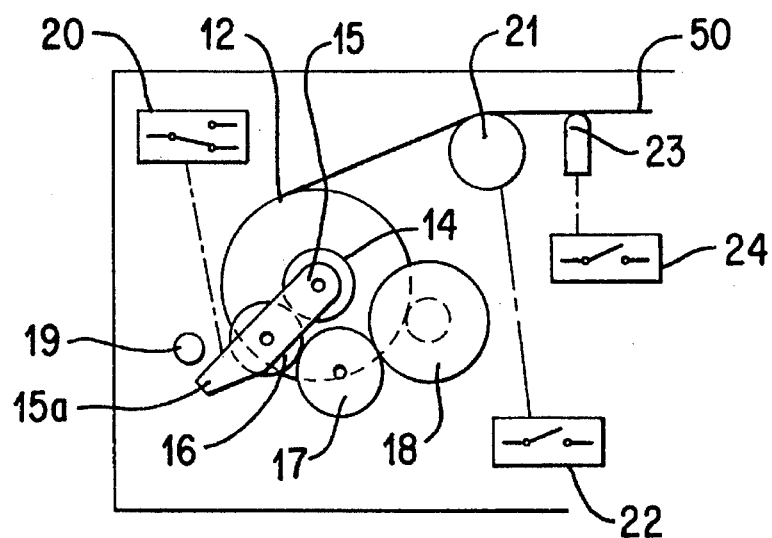
FIG. 2 is a top view of the FIG. 1 camera, showing the film winding mechanism.

In FIG. 1, the film winding mechanism 4 is comprised of a spool 12, a winding motor 13 mounted in the spool 12, and an unrepresented deceleration system. FIG. 2 is a drawing showing the film winding mechanism, and is a top view as seen from the direction indicated by arrow B in FIG. 1. A gear 14 is fixed to the output shaft of the winding motor 13, and a planetary gear 16 is supported by a connecting lever 15 on the gear 14, planetary gear 16 being capable of selective engagement with another gear 17 through the rotation of the connecting lever 15, the gear 17 fitting together with a gear 18 that causes the spool 12 to rotate.

When the winding motor 13 rotates in the direction opposite that shown in FIG. 2, the connecting lever 15 rotates in the clockwise direction, the portion 15a of the lever being restricted to a position where it is in contact with a limiting member 19. At this time, the engagement between the planetary gear 16 and gear 17 is released. A switch 20 switches in conjunction with the movement of the connecting lever 15, and produces signals that correspond to the engagement and release of the planetary gear 16 and gear 17. The state wherein the planetary gear 16 and gear 17 are engaged will be referred to as the "winding mode," hereafter, while the state wherein the engagement has been released and the connecting lever is in contact with the limiting member 19 will be referred to as the "rewinding mode."

A subordinate motion unit 21 moves subordinate to the motion of the film 50, and when winding of a single frame of the film has been completed, the winding completion switch 22, which operates in conjunction with completion of winding of the film, produces a signal. A film detection unit 23 is provided next to the subordinate motion unit 21, and a film detection switch 24 connected to this unit produces a signal in conjunction with the presence or absence of the film 50.

Figure 3:
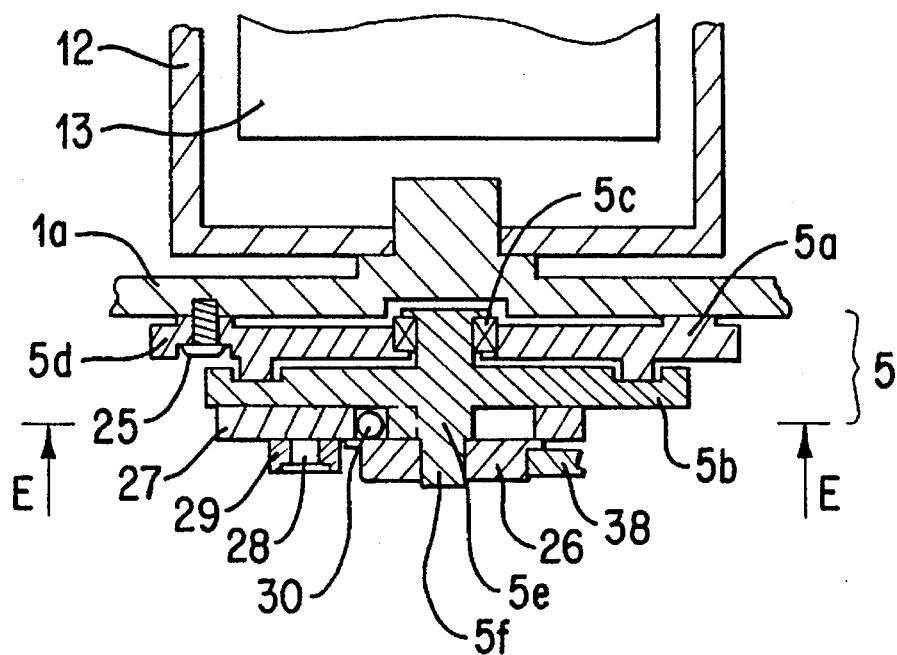
FIG. 3 is a side cross-sectional view of the flat motor located below the camera spool chamber.

FIG. 3 is a drawing showing the shutter motor 5 and the output unit that is on the same axis, FIG. 3 being a side cross-sectional view as seen from the direction indicated by arrow C in FIG. 1. The shutter motor 5 is positioned on the same axis as the spool 12 (i.e., the shutter motor 5 and the spool 12 are coaxial). The shutter motor 5 is a commonly-known ultrasonic motor having a stator 5a, a rotor 5b and a bearing 5c, the motor being fixed to the bottom 1a of the spool chamber by a screw 25 in a circular knob component 5d where vibration is zero on the stator 5a. The center of the rotor includes a clutch cam 5e (described hereinafter), to the bottom edge 5f of which is attached a belt wheel 26.

Figure 4:
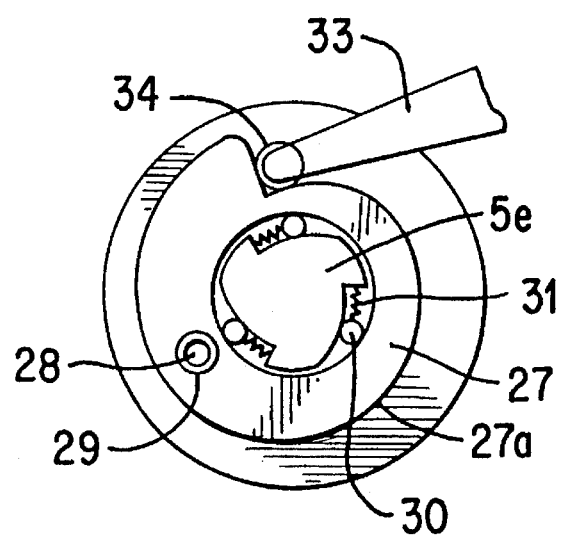
FIG. 4 is a plan view of the one-way clutch in the FIG. 1 camera.

A cam 27 fits on the perimeter of the clutch cam 5e, a roller 29, which is supported by a shaft 28, being provided on the cam 27. FIG. 4 is a cross-sectional view taken along line E in FIG. 3. The clutch cam 5e and the cam 27 are supported by three balls 30 and compression springs 31 between them to form a one-way clutch. In other words, when the clutch cam 5e rotates in the counterclockwise direction, the cam 27 moves subordinate to the clutch cam 5e, but when the clutch cam 5c rotates in the opposite direction, the cam 27 does not rotate so that rotational drive force is not transferred.

Figure 5:
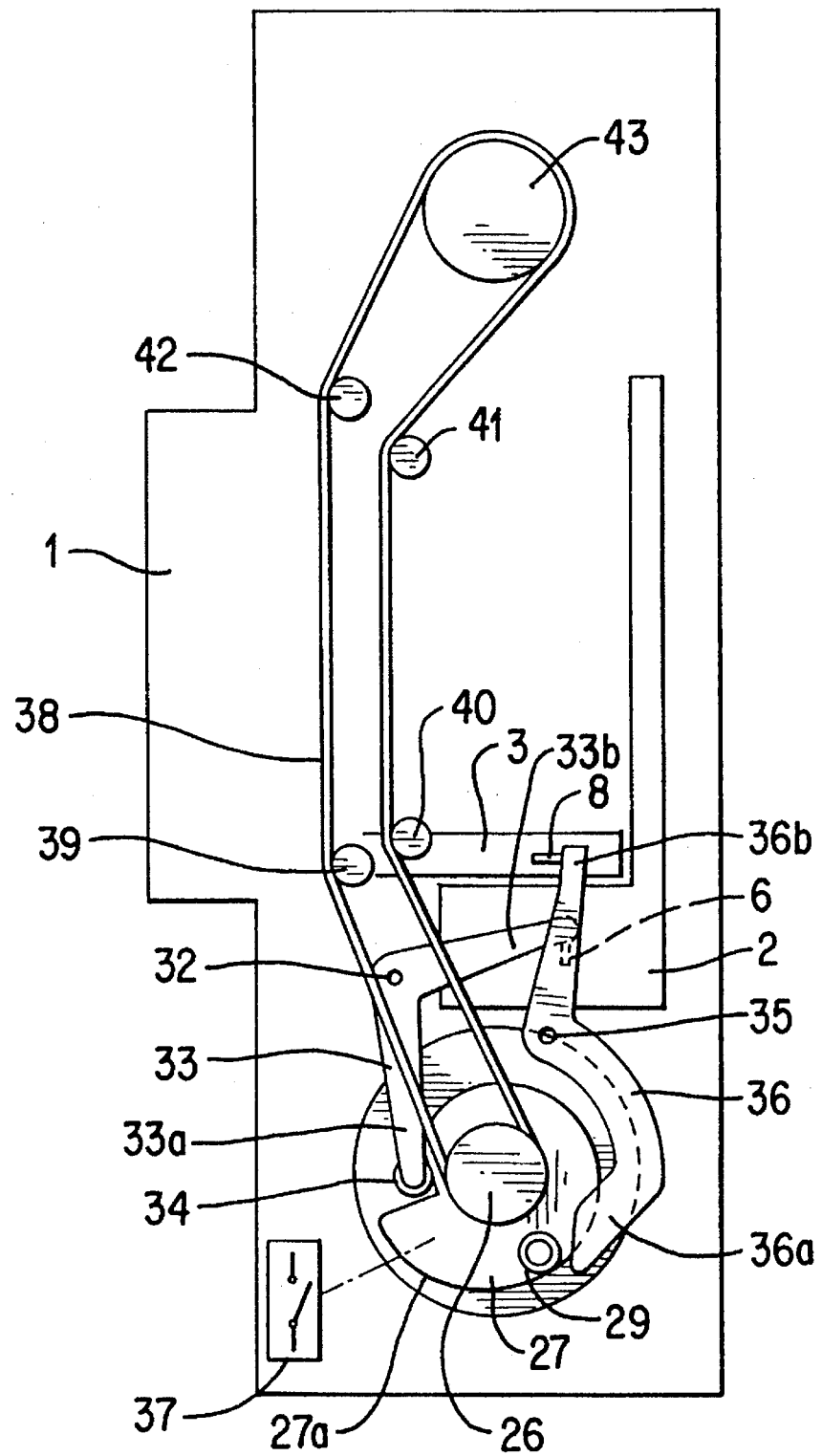
FIG. 5 is a bottom view of the FIG. 1 camera showing the mechanism that transmits power from the flat motor to the film cartridge chamber.

FIG. 5 is a drawing showing the bottom of the camera 1, and is a bottom view as seen from the direction indicated by arrow D in FIG. 1. The state shown in FIG. 5 is the film winding mode, and this figure shows the state prior to charging of the shutter 2 and the mirror mechanism 3. A roller 34 is provided at one end 33a of the shutter charge lever 33 supported on a fixed shaft 32, while the other end 33b engages with the shutter lever 6, the roller 34 making contact with the cam surface 27a of the cam 27.

The mirror charge lever 36, which is supported on a fixed shaft 35, is designed so that the arm 36a is capable of engagement with the roller 29 on the cam 27, the tip 36b engaging with the mirror lever 8. In addition, a shutter charge completion switch 37 is provided and produces a signal in conjunction with the movement of the cam 27 to the position shown in the figure, i.e. when the shutter charge completion position is reached. A belt 38 on the belt wheel 26 is placed on the rewinding shaft belt wheel 43, being guided by rollers 39, 40, 41 and 42. As shown in FIG. 1, the rewinding shaft belt wheel 43 is connected to the rewinding fork shaft 45 via a clutch 44, the fork shaft 45 becoming engaged with an unrepresented key in the cartridge 51. The clutch 44 is in a rotation transfer state only when the rewinding mode is set by an unrepresented winding operation unit.

Figure 7:
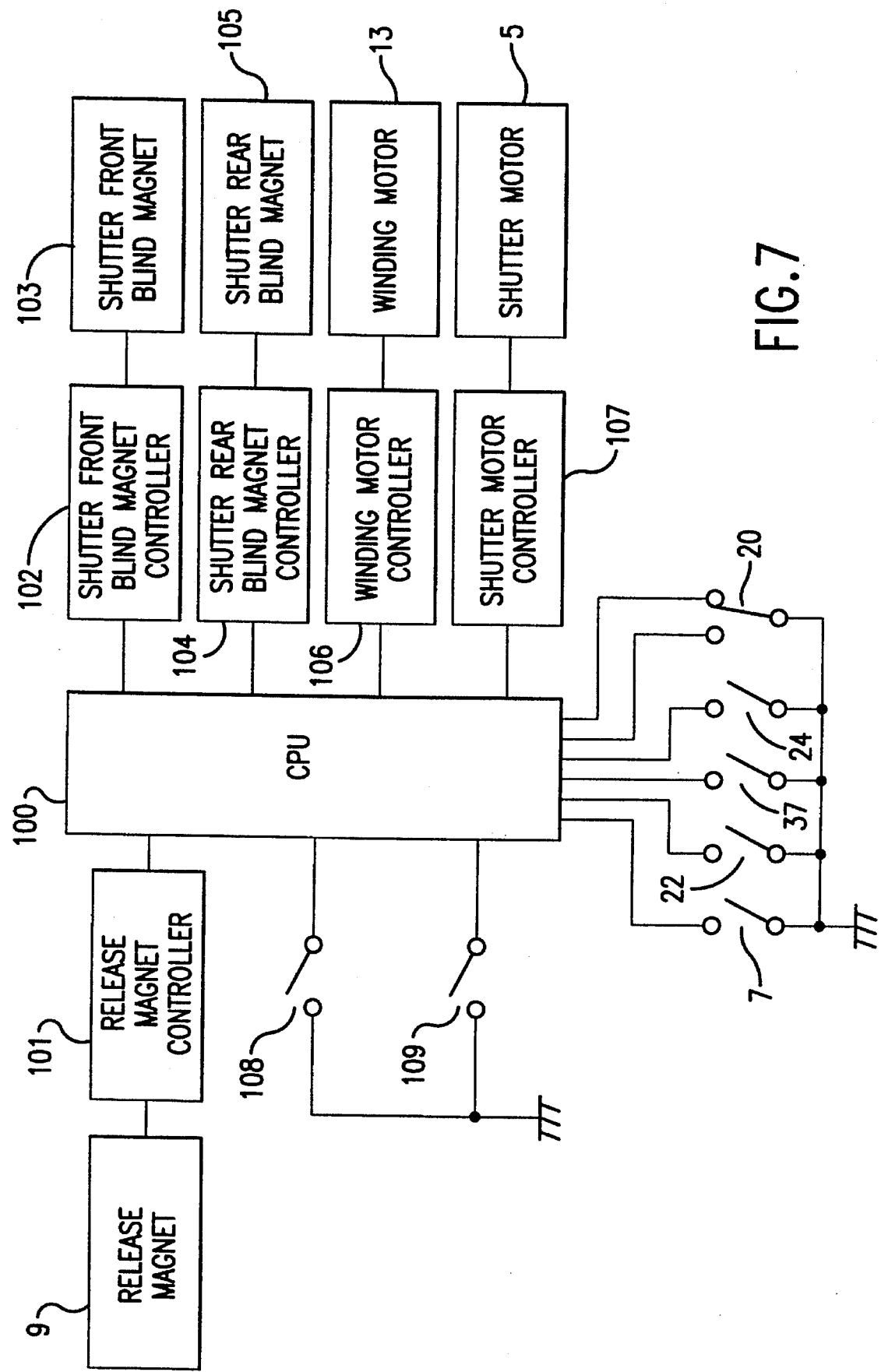
FIG. 7 is a block diagram of the FIG. 1 camera.

FIG. 7 is a block diagram showing components relating to the control of the electric camera, the system being comprised of a CPU 100, a release magnet controller (or circuit) 101, a release magnet 9, a shutter front blind magnet controller (or circuit) 102, a shutter front blind magnet 103, a shutter rear blind magnet controller (or circuit) 104, a shutter rear blind magnet 105, a winding motor controller (or circuit) 106, a winding motor 13, a shutter motor controller (or circuit) 107, a shutter motor 5, a release switch 108, a winding switch 109, an exposure completion switch 7, a winding completion switch 22, a shutter charge completion switch 37, a film detection switch 24, and a switch 20. The shutter front blind magnet 103 is a device that starts the movement of the shutter front blind, and the shutter rear blind magnet 105 is a device that starts the movement of the shutter rear blind.

Figure 8:
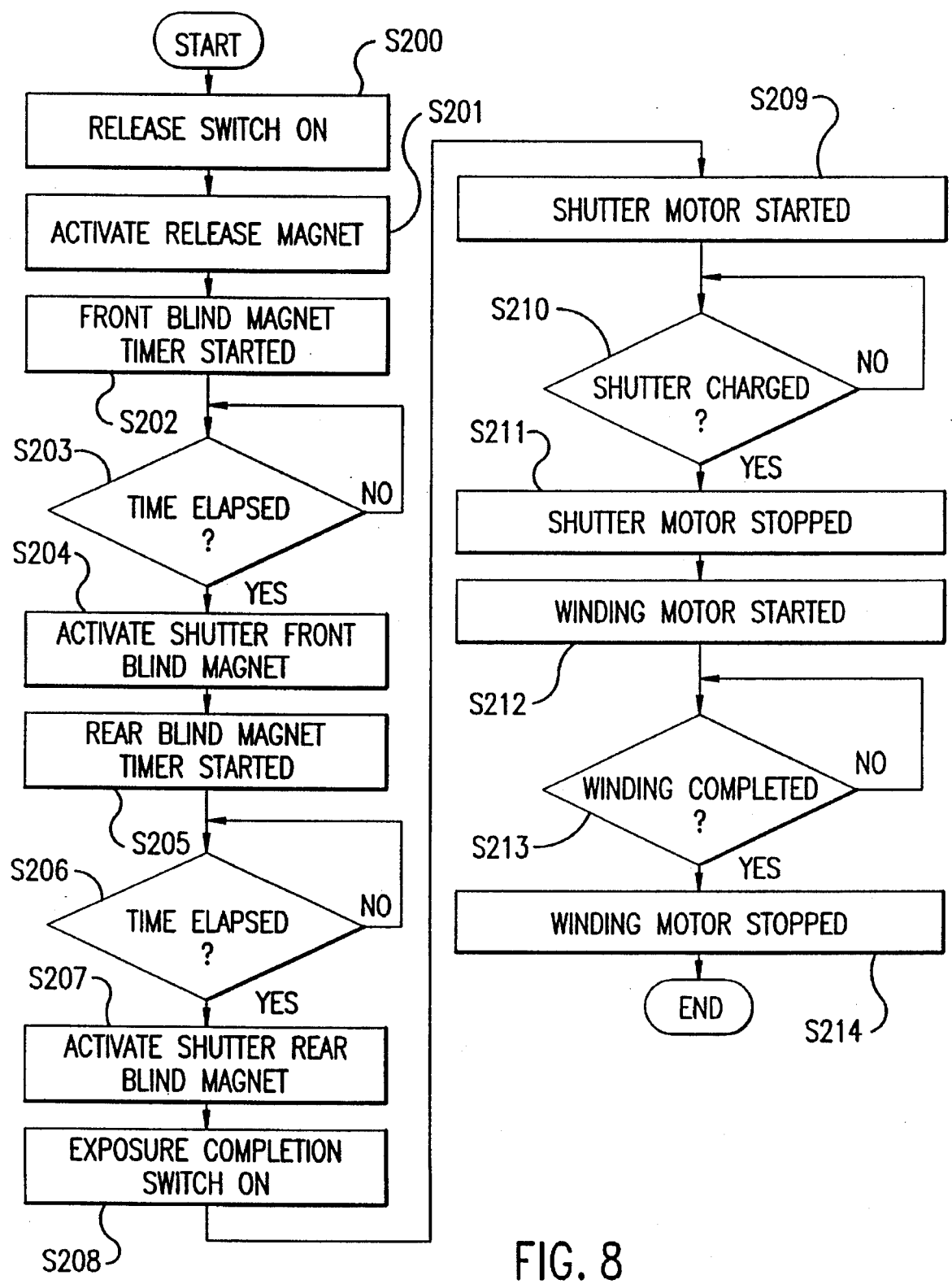
FIG. 8 is a flowchart explaining an operation routine of the FIG. 1 camera.

FIG. 8 is a flowchart that explains the winding operation conducted by the CPU 100, described hereafter. FIGS. 2 and 5 show the state where film winding, shutter driving and mirror driving have been completed and exposure preparation actions have been undertaken.

When the program in FIG. 8 starts, a release signal is created in step S200 by the release switch 108 being turned ON through the operation of an unrepresented release unit, such as a release button, for example. In step S201, the release magnet is activated upon receiving the release signal, a diaphragm action being executed to a predetermined diaphragm value through the raising of the mirror 10 and the action of the diaphragm control mechanism 11. In step S202, the front blind magnet timer is started, the timer being comprised of a device that causes the operation of the shutter front blind magnet to start after a preset time interval has elapsed following the creation of the release signal. The preset time interval is the time required for the raising of the mirror and for the completion of the diaphragm action.

In step S203, time is measured following the starting of the timer, and when the preset time interval has elapsed, the CPU advances to step S204. In step S204, through the action of the front blind magnet 103, the front blind begins to move. In step S205, a rear blind magnet timer is started from the beginning of action by the shutter front blind magnet 103. This timer is a device that corresponds to the length of time the shutter is open. In step S206, time is measured following the starting of the timer, and when a preset time interval has elapsed, the CPU advances to step S207.

In step S207, through the action of the rear blind magnet 105, the rear blind begins to move. In step S208, an exposure completion signal is created by the exposure completion switch 7 turning ON in conjunction with the starting of the movement of the rear blind. In step S209, the shutter motor 5 is turned ON with the exposure completion signal acting as the trigger, the shutter motor 5 in FIG. 5 rotating in the counterclockwise direction, the rotation being transferred to the cam 27 by the clutch cam 5e. When the cam 27 rotates in the counterclockwise direction, the roller 29 causes the mirror charge lever 36 to rotate in the counterclockwise direction, by which means the mirror lever 8 is driven toward the left in the figure. Because of this, the mirror 10 drops and the diaphragm control mechanism 11 is reset.

Simultaneously, the shutter charge lever 33 is caused to rotate in the clockwise direction by the rotation of the cam 27, the shutter lever 6 which engages with this shutter charge lever being driven downward in the drawing, thereby charging the shutter 2. Because the belt wheel 26 (FIG. 5) which is directly connected to the rotor 5b is also driven rotationally, the rewinding shaft belt wheel 43 also rotates via the belt 38, but the fork shaft 45 does not rotate because the clutch 44 (FIG. 1) is in a non-transfer state.

In step S210, the state of the shutter charge completion switch 37 is determined starting at the time when the shutter motor 5 is turned ON, and the CPU advances to step S211 when the charge completion signal is output. In step S211, the shutter motor 5 turns OFF and is stopped. In step S212, the winding motor 13 is turned ON using the shutter charge completion signal as a trigger, and rotates in the first direction. The rotation of the winding motor 13 causes the spool 12 to rotate via gear 14, planetary gear 16 and gear 18 (see FIG. 2), thereby winding the film.

In step S213, the state of the winding completion switch 22 is determined starting at the time when the winding motor 13 turns ON, and the CPU advances to step S214 when a winding completion signal is output. In step S214, the winding motor 13 turns OFF and is stopped, thus completing the winding routine.

Figure 9:
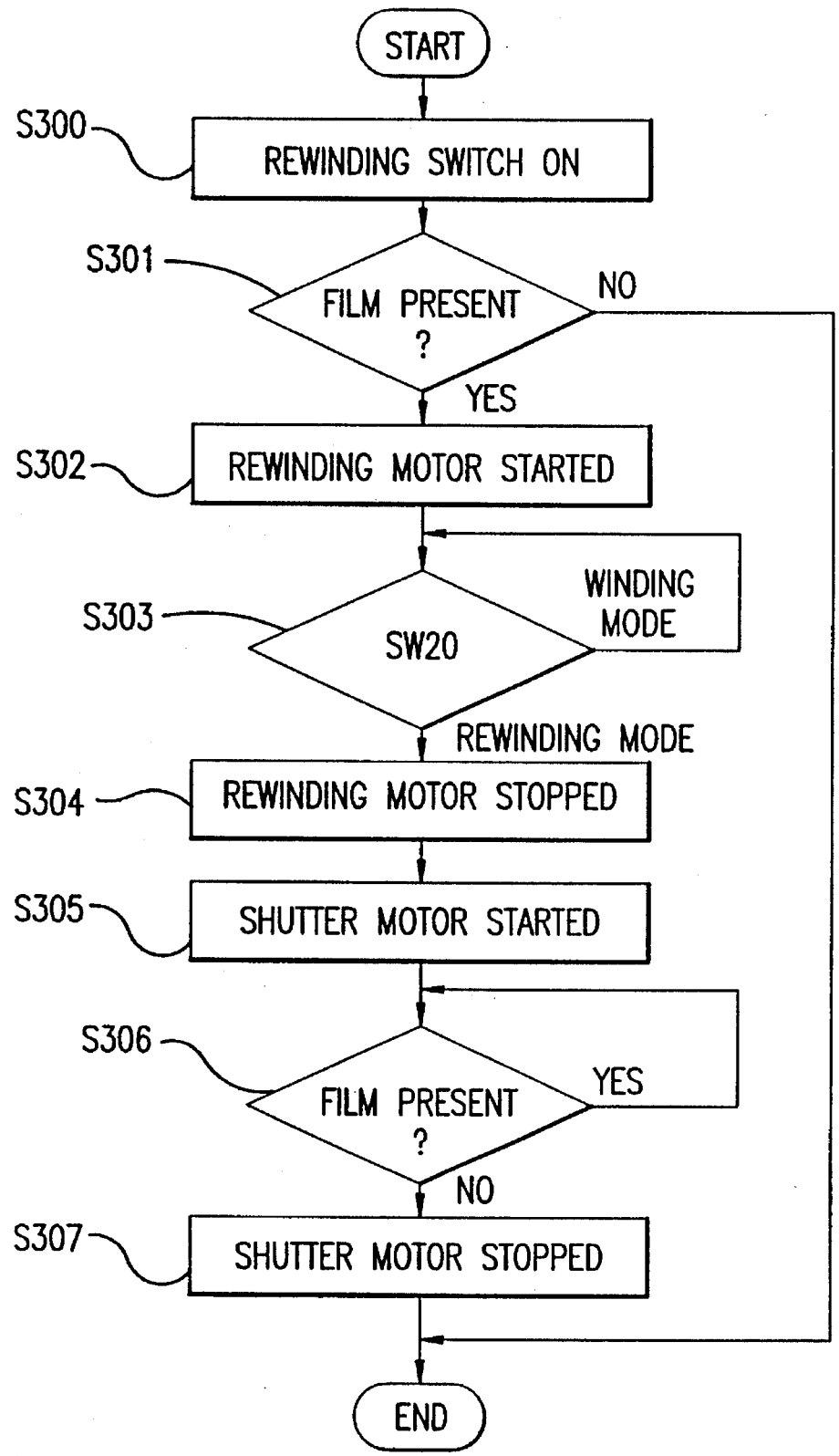
FIG. 9 is a flowchart explaining an operation routine of the FIG. 1 camera.

FIG. 9 is a flowchart explaining the rewinding actions conducted by the CPU. Hereafter, the rewinding actions will be described. In the winding mode prior to the conducting of rewinding, the camera is in the state shown in FIG. 2.

When the program shown in FIG. 9 starts, the rewinding switch 109 is turned ON in step S300 through the operation of an unrepresented rewinding start unit. In step S301, the state of the film detection switch 42 is determined, and the CPU advances to step S302 if the state of the film is "present." The routine is completed if the state is "absent."

In step S302, the winding motor 13 is turned ON. However, the motor rotates in the direction opposite to the first direction of rotation of the winding mode. The connecting lever 15 rotates in a clockwise direction in the figure by means of reverse rotation of the winding motor 13, causing the engagement between the planetary gear 16 and gear 17 to be released. In step S303, the state of the switch 20 is determined, the CPU advancing to step S304 when the state detected is one in which the connecting lever 15 is in contact with the limiting member 19, i.e. when the camera has switched to the "rewinding mode."

In step S304, the winding motor 13 turns OFF and is stopped. In step S305, the shutter motor 5 turns ON. However, because the motor rotates in the opposite direction to that of the winding mode, the cam 27 does not transfer the rotation. Because of the rotation of the belt wheel 26 (see FIG. 5), which is directly connected to the rotor 5b, the rewinding shaft belt wheel 43 also rotates via the belt 38. In the rewinding mode, the clutch 44 (see FIG. 1) is in a transfer state, the fork shaft 45 also rotating, the film 50 being rewound to the cartridge 51 through the engagement of the fork shaft 45 with an unrepresented key in the cartridge 51.

In step S306, the state of the film detection switch is determined starting when the shutter motor 5 is turned ON, the CPU advancing to step S307 when a film "absent" detection signal is output. In step S307, the shutter motor 5 turns OFF and is stopped, thus completing the rewinding routine.

Figure 10:
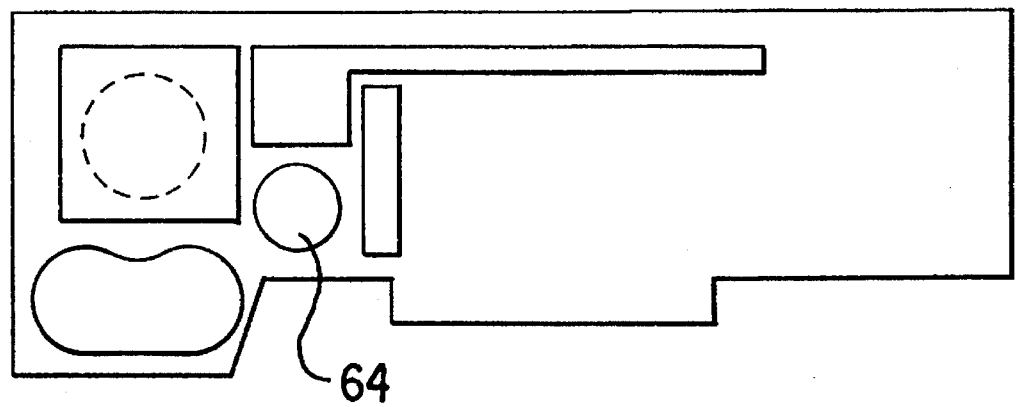
FIG. 10 is a top view of the FIG. 1 camera.
Figure 11:
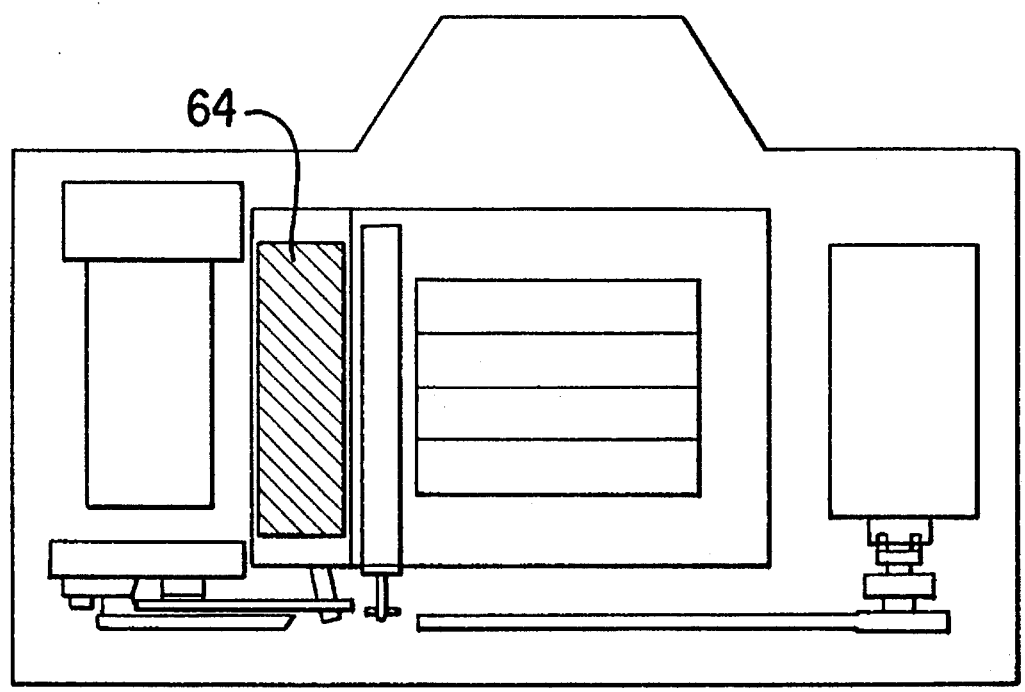
FIG. 11 is a front view of the FIG. 1 camera.
Figure 12:
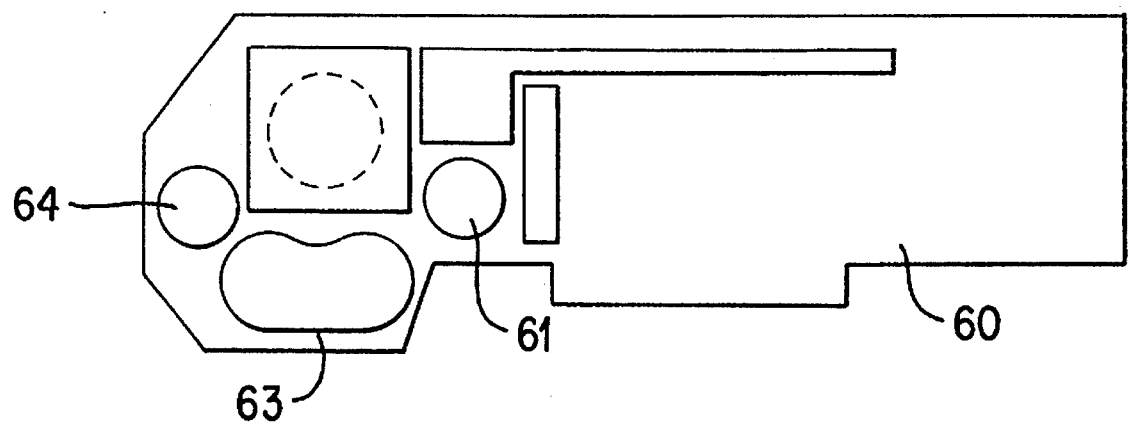
FIG. 12 is a top view of a conventional camera.
Figure 13:
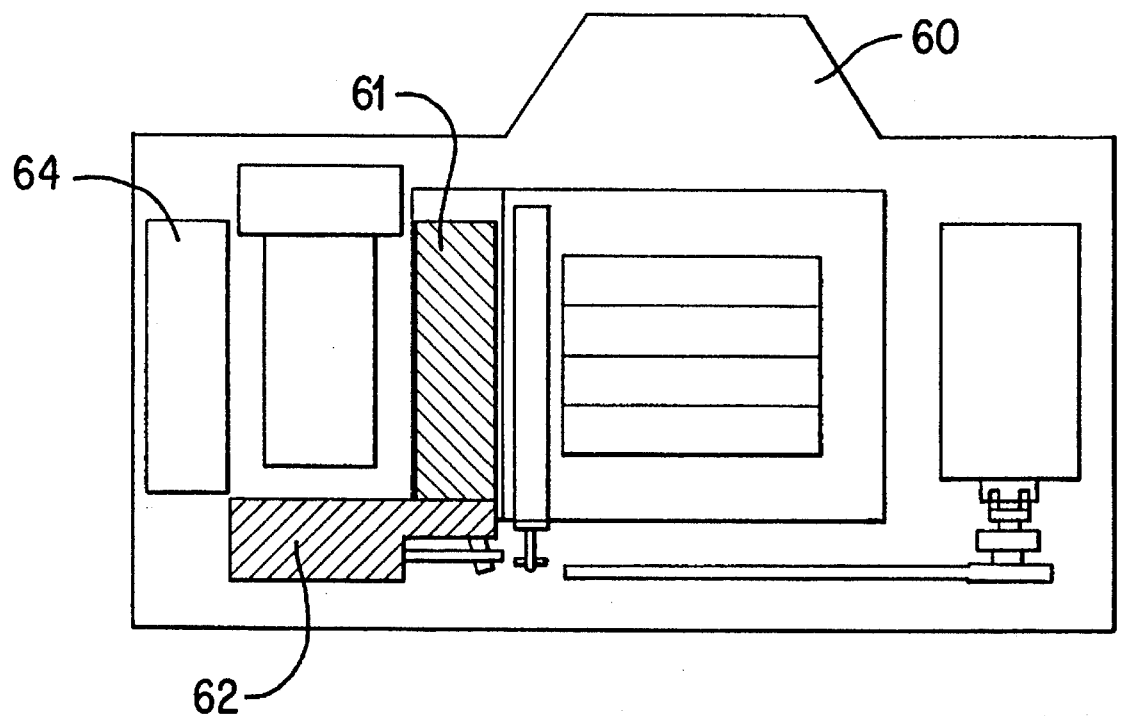
FIG. 13 is a front view of the FIG. 12 conventional camera.

As explained above, the shutter motor 5 is comprised of a flat motor, located below the spool chamber. Therefore, a large capacity condenser (capacitor) 64 can be positioned (see FIGS. 10 and 11) in the space traditionally used by the driving motor 61 (see FIGS. 12 and 13). By this means, the width of the camera can be made smaller by the width of the drive motor 61, and operation of the electric camera can be enhanced.

In other words, through trial calculations made by the inventor of the present invention, it was learned that the size of the flat ultrasonic motor that comprises the shutter motor 5 could be made practically, with about the same diameter as the diameter of the spool chamber. Because of this, the housing of the motor can be accomplished with a shape created by extending the length of the spool chamber and by providing the motor on essentially the same axis as the spool chamber.

Obviously, the same effects can be attained with a structure wherein the motor is positioned above rather than below the spool chamber. In addition, with the present invention a sequence is used wherein the film is wound after the shutter driving is completed, but it would also be acceptable to reverse this order.

With the described embodiment of the invention, the drive motor is comprised of a flat motor and is situated either above or below the spool chamber or the cartridge chamber. Consequently, it is possible to place a large capacity condenser in the space traditionally used by the driving motor. By this means, the width of the electric camera can be reduced to the fullest extent possible, and operations can be enhanced.

A second embodiment of the present invention is described hereafter with reference to FIG. 14–FIG. 20.

Figure 14:
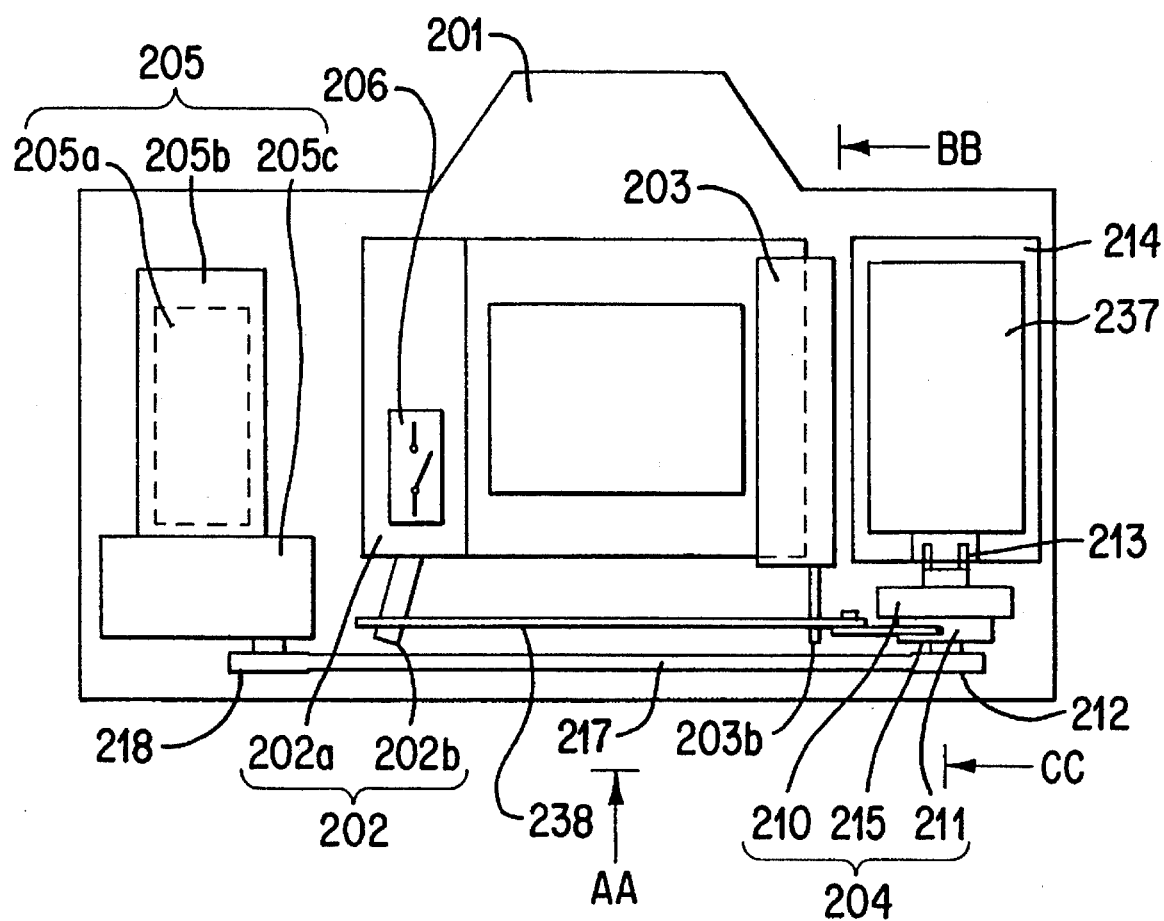
FIG. 14 is a front view of a camera according to a second embodiment of the present invention.

FIG. 14 is a front view showing an outline of components of a camera according to the second embodiment of the present invention.

Figure 15:
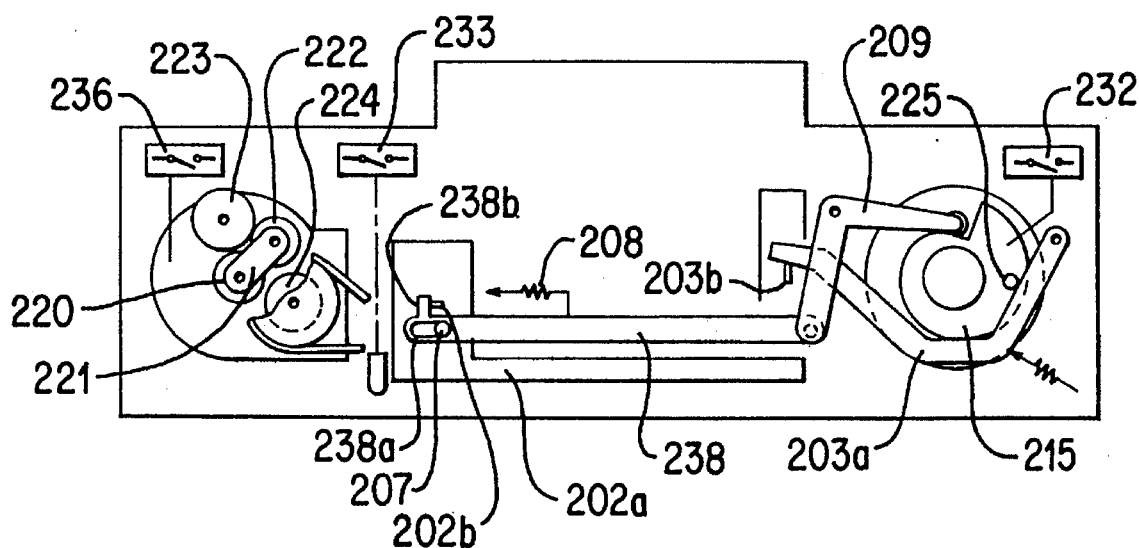
FIG. 15 is a bottom view of the camera in FIG. 14.

FIG. 15 is a drawing showing a cross section of the outline drawing of the camera in FIG. 14, as indicated by arrow AA.

In FIG. 14, a shutter device 202 is positioned almost at the center of the camera body 201. The mirror device 203 is positioned to the right side of the shutter device 202, and the cartridge chamber 214 is positioned to the right of the mirror device 203, the cartridge chamber 214 removably holding a film cartridge 237. The spindle of the cartridge chamber 214 and the spindle of the cartridge 237 are coupled to each other and function as one spindle during use.

The motor device 204 is positioned at the bottom of the cartridge chamber 214 in the present embodiment.

The film winding device 205 is positioned at the left side of the camera body 201.

The shutter device 202 comprises a main shutter component 202a and a shutter lever 202b. The exposure completion switch 206 is a device that transmits a signal upon the completion of the shutter action, and the interlocking lever 238 is a component that interlocks with the shutter lever 202b.

As shown in FIG. 15, the interlocking lever 238 has a guide slot 238a and a key portion 238b at the left end of the drawing. The guide slot 238a interlocks with a fixed spindle 207, and the key portion 238b connects with the shutter lever 202b. The shutter lever 202b is pushed in the direction shown by the arrow by the spring 208.

The interlocking lever 238 is driven by an ultrasonic wave motor 210, described hereafter, via a shutter charge lever 209 that is connected at the right end of FIG. 15.

The main shutter component 202a comprises a commonly known front shutter blind and rear shutter blind (not shown).

Figure 16:
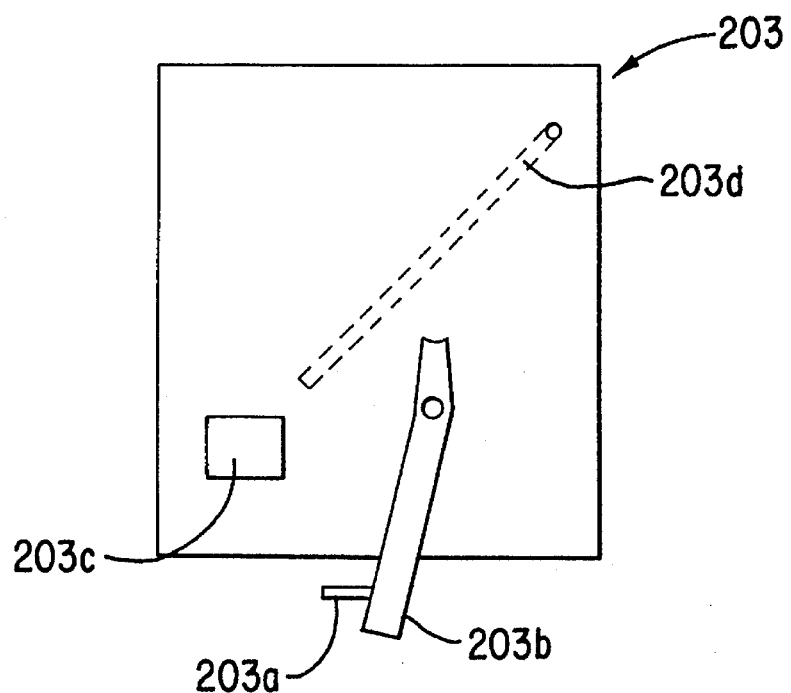
FIG. 16 is a side view of the quick return mirror of the FIG. 14 camera.

FIG. 16 is a drawing showing an enlargement of the cross section of the mirror device 203 of FIG. 14 indicated by arrow BB.

In FIG. 16, the mirror device 203 comprises a mirror charge lever 203a, a mirror lever 203b, a release magnet 203c, and a mirror 203d.

The mirror charge lever 203a connects to a pin 225, which is affixed to the cam 215 shown in FIG. 15, through the driving action of the ultrasonic wave motor 210, which will be described thereafter, and moves the mirror lever 203b.

The release magnet 203c uses a release signal as a trigger and demagnetizes the magnet 203c, allowing the mirror 203d to move up.

Figure 17:
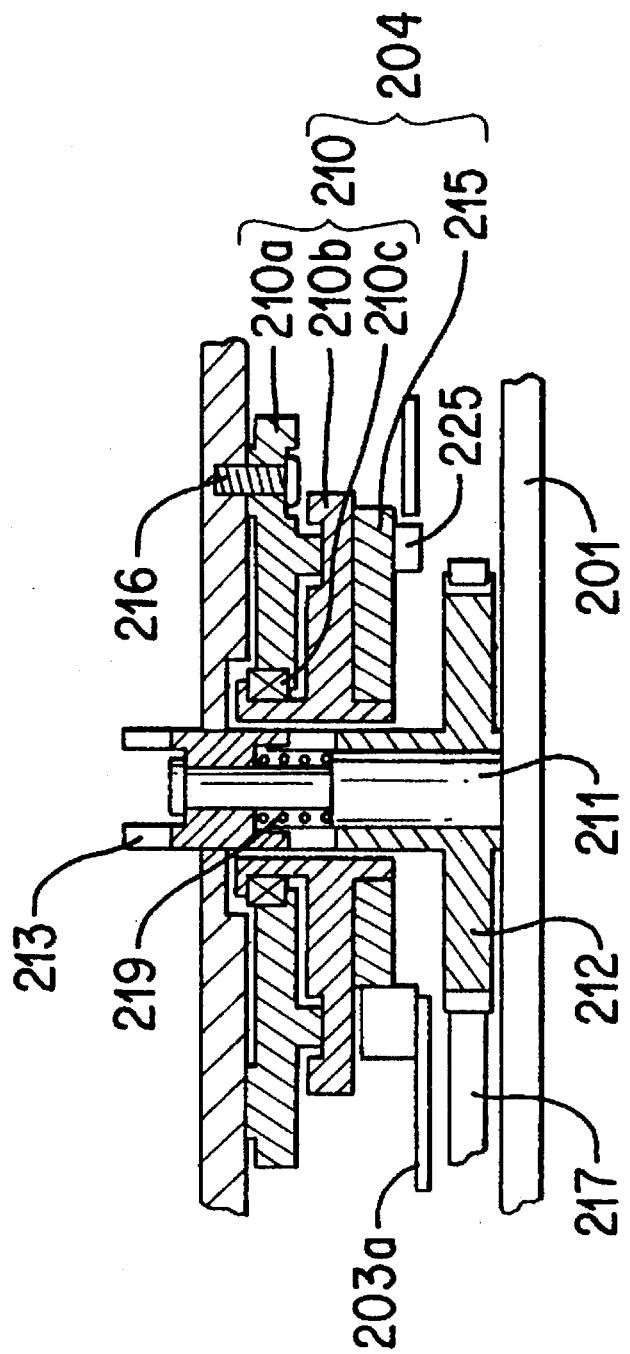
FIG. 17 is an enlarged cross section of the ultrasonic motor of the FIG. 14 camera.

FIG. 17 is a drawing showing an enlargement of the cross section of the motor component 204 of FIG. 14 indicated by arrow CC.

In FIG. 17, the shaft component 211 is of a stepped formation, and is affixed to the lower portion of the camera body 201.

The ultrasonic wave motor 210 is a commonly known device that comprises a stator 210a, a rotor 210b, and a bearing 210c, each of which are ring-shaped (hollow). A cam 215 is affixed to the rotor 210b.

The ultrasonic wave motor 210 is positioned at the bottom of the cartridge chamber 214 so as to form a single shaft with the spindle component 211 (i.e., the spindle component 211 and the motor 210 are coaxial), and is attached to the cartridge chamber 214 by a screw 216 above a section on the top of the stator 210a at which the vibration is zero. In other words, the ultrasonic wave motor 210 and the cartridge chamber 214 form a single shaft through the shaft component 211. The central axis of the motor 210 and of the cartridge chamber 214, about which rotation takes place, are coaxial.

Since the ultrasonic wave motor 210 is ring-shaped (hollow) as described above, a hollow space is formed between the ultrasonic wave motor 210 and the drive shaft 211.

Since a flexible print base plate (not shown) is positioned at the top of the cartridge chamber 214, the ultrasonic wave motor 210 is positioned at the bottom of the cartridge chamber 214 in order to efficiently use the space inside the camera on the present embodiment.

With the present embodiment, the ultrasonic wave motor 210 drives the shutter device 202 and the mirror device 203.

The belt wheel 212 and the fork component 213 are positioned in the hollow space formed between the ultrasonic wave motor 210 and the drive shaft 211. In other words, the belt wheel 212 fits over the drive shaft 211, and the fork component 213 fits over the top of the drive shaft 211. In addition, the fork component 213 connects with the spindle of the film cartridge 237 placed in cartridge chamber 214.

The belt wheel 212 and the fork component 213 form the winding/rewinding component 205c of the film feeding device 205, which will be described hereafter.

The belt 217 is held by the belt wheel 212 and the belt wheel 218 of the film feeding device 205, which will be described hereafter. A compression spring 219 is positioned between the belt wheel 212 and the fork component 213, forcing the fork component 212 in the upward direction of the drawing.

Returning to FIG. 14, the film feeding device 205 comprises a winding/rewinding motor 205a, spool 205b and winding/rewinding mechanism 205c (a force transmitting component).

The winding/rewinding motor 205a reverses the direction of rotation, depending on whether the film is to be wound or rewound.

The spool 205b interlocks with the rotation of the winding/rewinding motor 205a when the film is wound up.

The winding/rewinding mechanism 205c (force transmitting component) transmits the driving force of the winding/rewinding motor 205a to the cartridge 237 when rewinding the film.

As shown in FIG. 15, a gear 220 is affixed to the shaft (not shown) of the above-mentioned winding/rewinding motor 205a. A coupling component 221 supports the gear 220 and a planetary gear 222. The planetary gear 222 connects with gear 223 or gear 224, depending on the direction of rotation of the winding/rewinding motor 205a.

Figure 18:
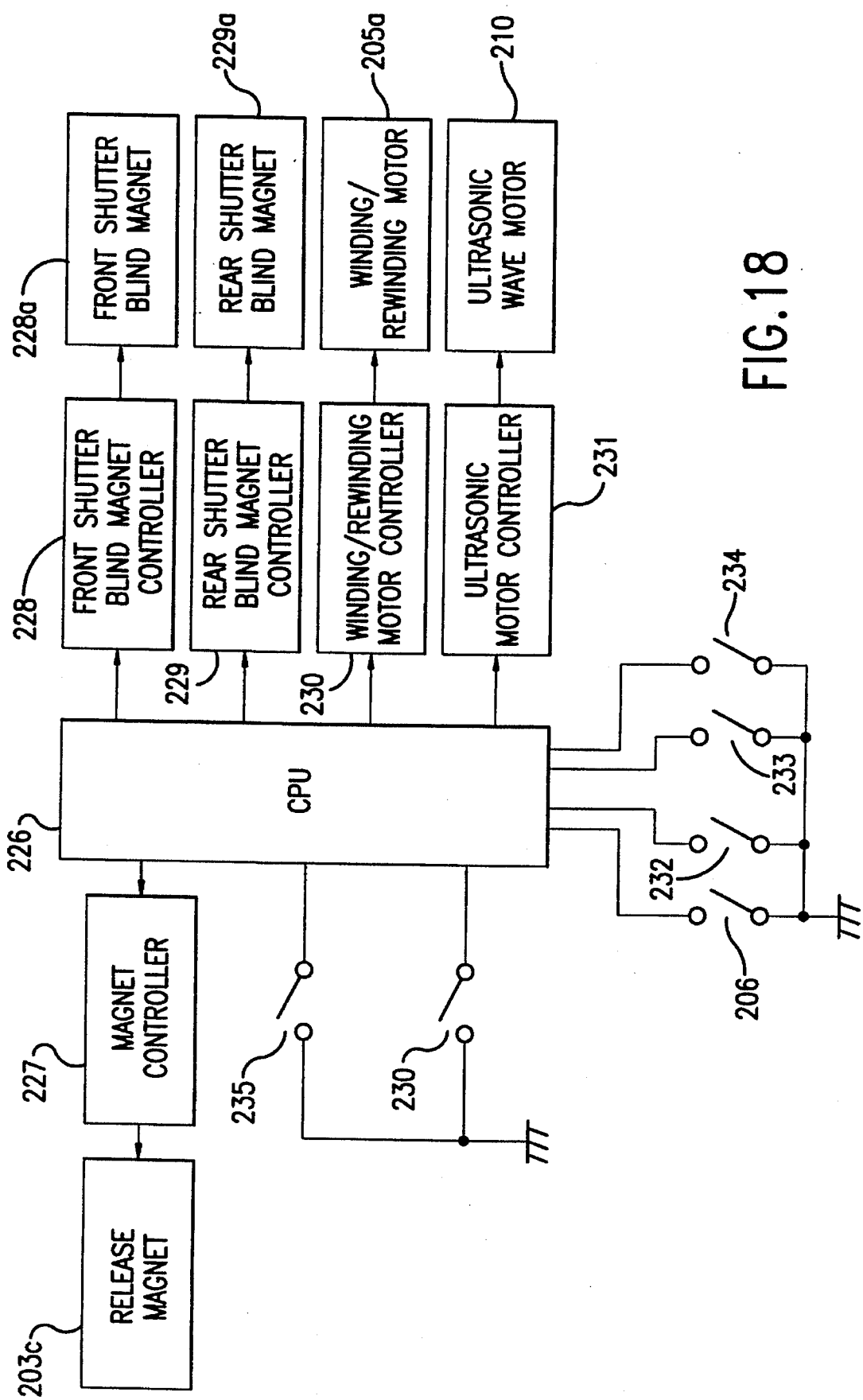
FIG. 18 is a block diagram of the FIG. 14 camera regulating system.

FIG. 18 is a drawing showing a block diagram of the winding/rewinding regulating system.

The CPU 226 regulates the entire camera. In particular, with the present embodiment, the CPU 226 regulates the release magnet 203c, the main shutter component 202a, and the motor system (the ultrasonic wave motor 210 and the winding/rewinding motor 205a).

In other words, the CPU 226 regulates the release magnet 203c via magnet regulating controller (or circuit) 227, and regulates the front shutter blind magnet 228a and the rear shutter blind magnet 229a via magnet regulating controllers (or circuits) 228 and 229.

The CPU 226 regulates the ultrasonic wave motor 210 and the winding/rewinding motor 205a via the motor regulating controllers (or circuits) 230 and 231. Contact signals from the exposure completion switch 206 shown in FIG. 14, the shutter charge switch 232 and the film detecting switch 233 shown in FIG. 15, and from the rewinding switch 234, the release switch 235, and the winding completion switch 236 are transmitted to the CPU 226.

Since the construction of the lens system, focus detection mechanism, and the like are the same as those of commonly known cameras, the descriptions thereof are omitted. The mirror driving action, shutter charge action, and winding/rewinding actions of the following embodiment are described hereafter.

Figure 19:
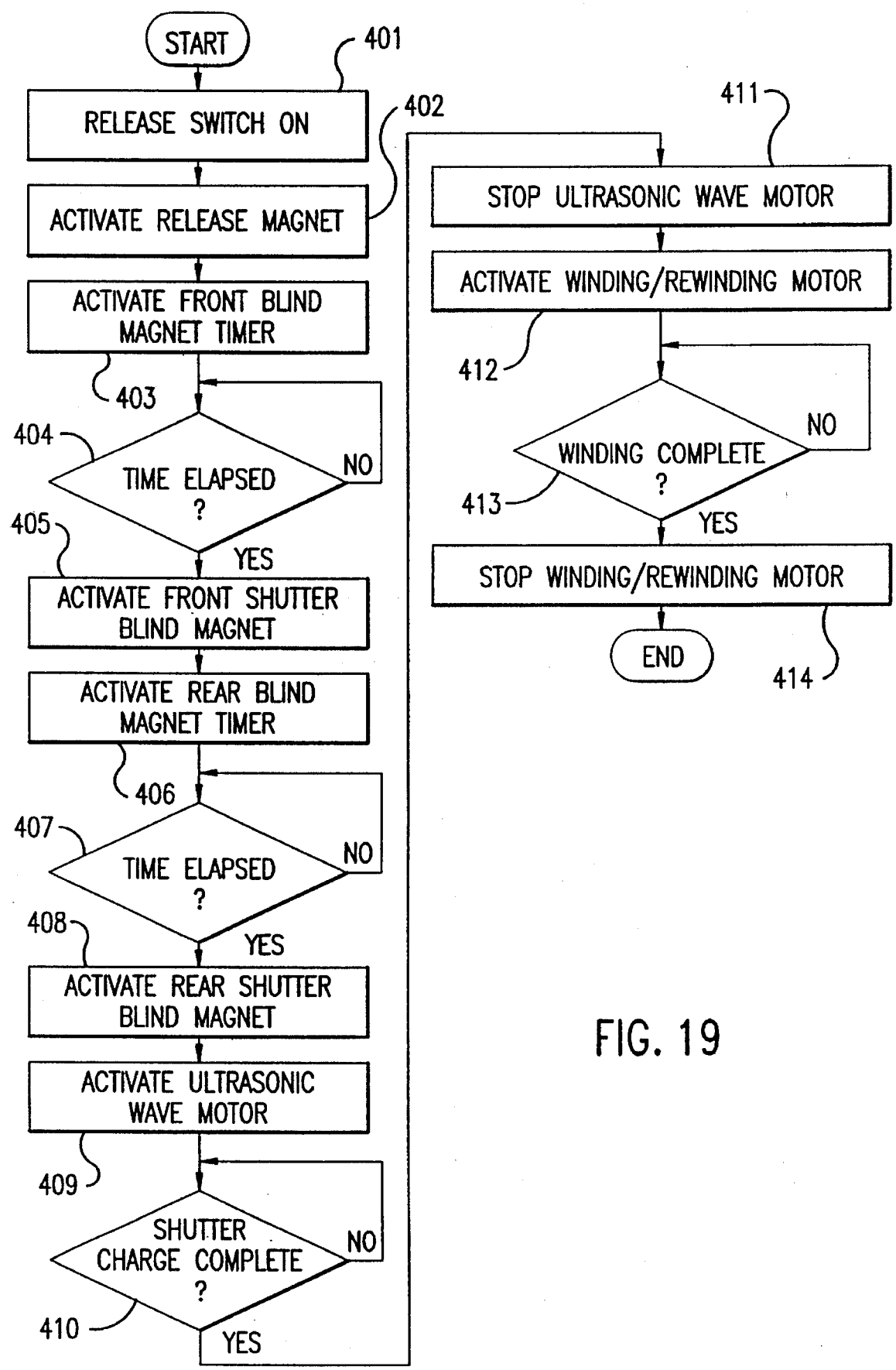
FIG. 19 is a flowchart showing the winding operation and the like of the FIG. 14 camera.

FIG. 19 is a flowchart showing the film winding action and the like of the CPU 226. The winding action and the like will be described below, with reference to the flowchart.

The CPU 226 makes a release signal when the release switch 235 is turned ON by the operation of a release component (not shown) (step S401).

The CPU 226 next drives the mirror 203d to the up position via the release-magnet 203c (step S402).

The CPU 226 starts the front blind magnet timer, which starts the action of front shutter blind magnet after a fixed time interval from the generation of the release signal (step S403). With the present embodiment, the fixed time interval is the time interval required until the mirror up action is completed.

The CPU 226 measures the time after the abovementioned timer has been activated, and proceeds to step S405 after a fixed time interval has elapsed (step S404).

The CPU 226 activates the front blind magnet. Thus, the front shutter blind (not shown) begins to move (step S405).

The CPU 226 activates the rear blind magnet timer, which starts the action of the rear shutter blind magnet after a set shutter time (step S406).

The CPU 226 measures the time after the described timer is activated, and proceeds to step S408 after a fixed time interval has elapsed (step S407).

The CPU 226 activates the rear blind magnet. Thus, the rear shutter blind (not shown) begins to move (step S408).

The CPU 226 uses the ON signal of the exposure completion switch 206, which has been activated upon the commencement of the rear shutter blind movement, as a trigger and drives the ultrasonic wave motor 210 (step S409).

In other words, through the rotation of the ultrasonic motor 210, the cam 215 rotates the mirror charge lever 203a in the counter-clockwise direction of FIG. 15 via the pin 225. Thus, since the mirror lever 203b is charged in the downward direction of FIG. 15, the mirror 203d is reset to the down position.

At the same time, the cam 215 rotates the shutter charge lever 209 in the counter-clockwise direction through the rotation of the ultrasonic wave motor 210. Since the interlocking lever 238 interlocks with the rotation of the shutter charge lever 209 and moves to the right of FIG. 15, the shutter lever 202b connected to the interlocking lever 238 also moves to the right, thereby charging the main shutter component 202a.

The CPU 226 proceeds to step S411 after an ON signal has been transmitted from the shutter charge switch 232 (step S410).

The CPU 226 stops the driving action of the ultrasonic wave motor (step S411).

The CPU 226 uses the ON signal from the shutter charge switch 232 as a trigger and rotates the winding/rewinding motor 205a in the winding direction (step S412).

In other words, the coupling component 221 rotates in the counter-clockwise direction through the rotation of the winding/rewinding motor 205a, the planetary gear 222 meshing with gear 218.

The rotation of the winding/rewinding motor causes the spool 205b to rotate via gear 220, the planetary gear 222, and gear 223, thereby winding the film.

The CPU 226 determines whether the signal of the winding completion switch 236 has been turned to ON. If the signal of the winding completion switch 236 has been turned to ON, the CPU 226 proceeds to step S414 (step S413).

The CPU 226 stops the winding/rewinding motor 205a (step S414).

Figure 20:
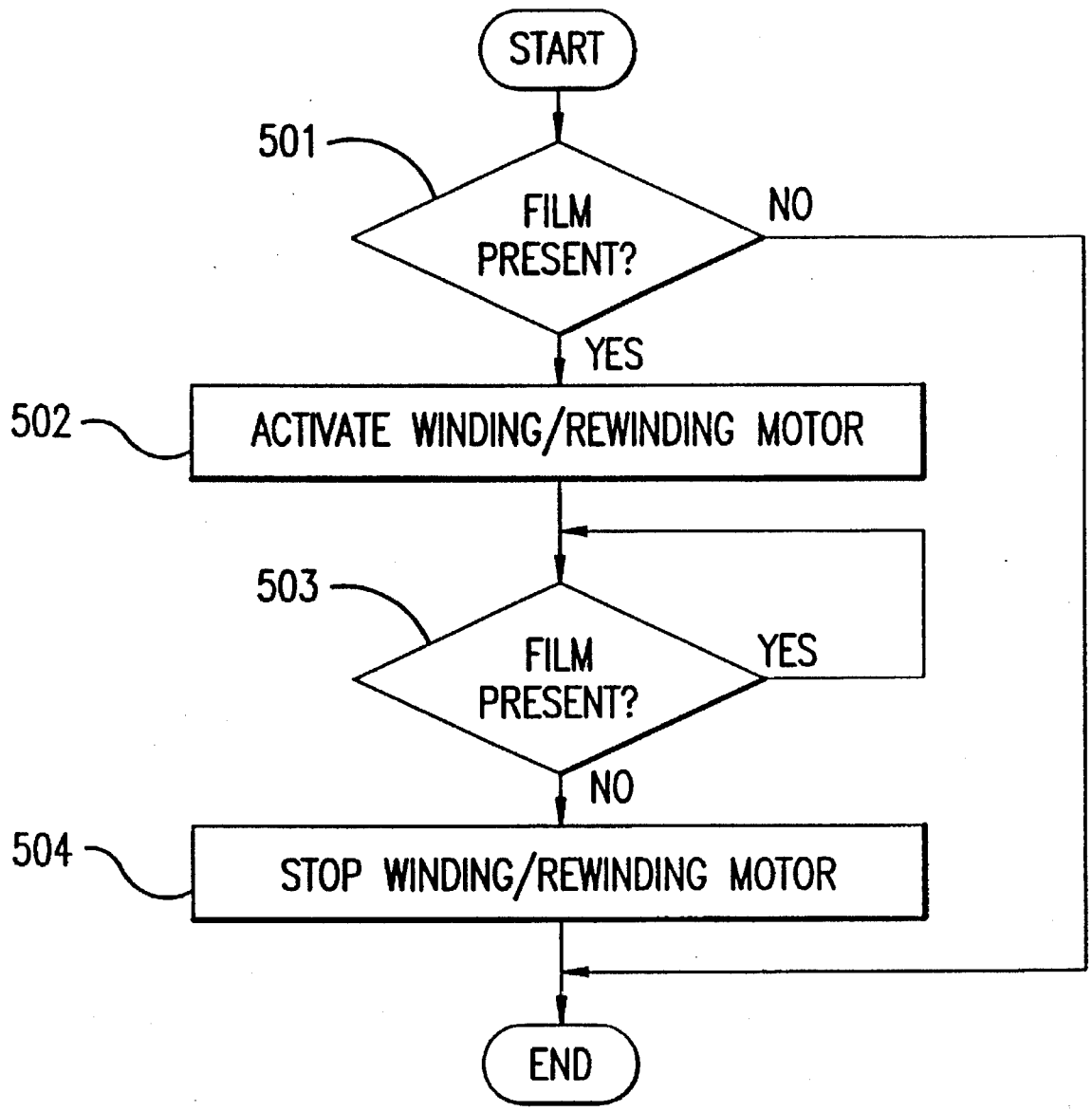
FIG. 20 is a flowchart showing the rewinding operation and the like of the FIG. 14 camera.

FIG. 20 is a drawing showing a flowchart of the film rewinding operation. The film rewinding operation is described hereafter, with reference to FIG. 20.

The CPU 226 starts the film rewinding operation when the signal from the rewinding switch 234 is turned to ON.

The CPU 226 determines whether film is present, based upon the signal from the film detecting switch 236. If film is present, the CPU 226 proceeds to step S502. If film is not present, the flowchart ends (step S501).

The CPU 226 rotates the winding/rewinding motor 205a in step S502.

The winding/rewinding motor 205a rotates in the opposite direction from the rotation direction described above. Thus, the coupling component 221 rotates in the clockwise direction, and the planetary gear 222 meshes with gear 224. The rotation of the winding/rewinding motor 205a is transmitted to the belt wheel 212 via the planetary gear 222, gear 224, belt wheel 218, and the belt 217.

As shown in FIG. 17, the rotation of the belt wheel 212 is transmitted to the fork component 213. Through the connection of the fork component 213 and the spindle of the cartridge 237, the film is rewound into the cartridge 237.

The CPU 226 again determines whether film is present, and proceeds to step S504 if film is not present (step S503).

The CPU 226 stops the winding/rewinding motor 205a, and the rewinding action is completed (step S504).

With the present embodiment, the ultrasonic wave motor 210 is positioned at the bottom of the cartridge chamber 214, but it should be obvious that the motor 210 may also be positioned at the top of the cartridge chamber 214.

In addition, a coreless motor, stepping motor, or the like may be constructed in a hollow condition and used in place of the ultrasonic wave motor 210.

By positioning the spindle of the cartridge chamber and the shaft of the motor device coaxially as a single shaft, as described above, the camera can be miniaturized because the space inside the camera is used efficiently.

When the camera uses an ultrasonic wave motor as the motor device, a large torque can be obtained at a low speed of revolution, and, therefore, speed-reduction devices such as gears or the like are not necessary. Thus the space inside the camera can be used even more efficiently, and noise and vibration can be minimized. Furthermore, since components for speed-reduction devices are not needed, the cost of the camera can be reduced.

Since a portion of the transmitting component of the film rewinding mechanism is positioned within the above-mentioned hollow shaft, the camera can be miniaturized because the space inside the camera can be utilized even more efficiently.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera comprising:

a cartridge chamber;

a spool chamber; and a driving motor coupled to a shutter activating mechanism, said driving motor including a rotor that rotates about a central axis of said driving motor, said central axis being parallel to longitudinal axes of said cartridge chamber and said spool chamber, said driving motor being a flat motor located adjacent to one end of one of said spool chamber and said cartridge chamber.

2. A camera according to claim 1, wherein said driving motor is a flat motor having a height extending along said central axis of said driving motor and a diameter extending in a direction substantially perpendicular to said central axis, said height being less than said diameter, and said driving motor diameter being approximately equal to a diameter of said one of said spool chamber and said cartridge chamber.

3. A camera according to claim 1, further comprising:

a film rewinding system that rewinds film in said spool chamber back to said cartridge chamber; and a transmission mechanism that links said driving motor and said film rewinding system, wherein said driving motor is a drive source for said shutter activating mechanism and said film rewinding system.

4. A camera according to claim 3, further comprising a one-way clutch linked to said driving motor between said driving motor and said shutter activating mechanism and said film rewinding system, wherein said driving motor transfers drive power through said one-way clutch to one of said shutter activating mechanism and said film rewinding system depending on a direction of rotation of said driving motor.

5. A camera according to claim 1, wherein said driving motor is located adjacent to one end of said spool chamber.

6. A camera according to claim 5, wherein said driving motor is coaxial with said spool chamber.

7. A camera according to claim 1, wherein said driving motor is located adjacent to one end of said cartridge chamber.

8. A camera according to claim 7, wherein said driving motor is coaxial with said cartridge chamber.

9. A camera according to claim 1, further comprising a movable mirror in said camera, said driving motor also being linked to said movable mirror to drive said movable mirror.

10. A camera according to claim 1, wherein said camera includes a top end and a bottom end opposite from said top end, said longitudinal axes of said spool chamber and of said cartridge chamber extending between said top end and said bottom end, said driving motor being located between said bottom end and one end of one of said spool chamber and said cartridge chamber.

11. A camera according to claim 10, wherein said driving motor is located between said camera bottom end and one end of said spool chamber.

12. A camera according to claim 10, wherein said driving motor is located between said camera bottom end and one end of said cartridge chamber.

13. A camera according to claim 8, wherein a spindle of said cartridge chamber and a rotor of said driving motor are substantially coaxial.

14. A camera according to claim 13, wherein said camera includes a top end and a bottom end opposite from said top end, said longitudinal axes of said spool chamber and of said cartridge chamber extending between said top end and said bottom end, said driving motor being located between said bottom end and one end of said cartridge chamber.

15. A camera according to claim 13, wherein said rotor of said driving motor includes a hole therethrough.

16. A camera according to claim 13, wherein said driving motor is an ultrasonic wave motor comprising:

a fixed element having an elastic member and a piezoelectric element attached to said elastic member; and a rotating element contacting with said fixed element, said rotating element being said rotor.

17. A camera according to claim 15, further comprising:

a second driving motor;

a transmission mechanism coupled to said second driving motor to transmit driving power from said second driving motor to a spindle of said cartridge chamber, wherein a portion of said transmission mechanism is positioned within said hole through said rotor.

18. A camera comprising:

a cartridge chamber; and a driving motor coupled to at least one of a mirror device that drives a mirror in said camera during exposure of film in said camera and a shutter device that regulates an exposure time interval of the film in said camera; wherein:

a spindle of said cartridge chamber and a rotor of said driving motor are substantially coaxial.

19. A camera according to claim 18, wherein said camera includes a top end and a bottom end opposite from said top end, said cartridge chamber having a longitudinal axis extending between said top end and said bottom end, said driving motor being located between said bottom end and said cartridge chamber.

20. A camera according to claim 18, wherein said rotor of said driving motor includes a hole therethrough.

21. A camera according to claim 18, wherein said driving motor is an ultrasonic wave motor comprising:

a fixed element having an elastic member and a piezoelectric element attached to said elastic member; and a rotating element contacting with said fixed element, said rotating element being said rotor.

22. A camera according to claim 20, further comprising:

a second driving motor;

a transmission mechanism coupled to said second driving motor to transmit driving power from said second driving motor to a spindle of said cartridge chamber, wherein a portion of said transmission mechanism is positioned within said hole through said rotor.

23. A camera comprising:

a cartridge chamber having a longitudinal axis;

a spool chamber having a longitudinal axis;

a shutter device that regulates an exposure time interval of film in said camera; and a flat, ultrasonic driving motor coupled to said shutter device and including:

a fixed element having an elastic member and a piezoelectric element attached to said elastic member; and a rotor contacting with said fixed element;

said ultrasonic driving motor being located adjacent to one end of one of said spool chamber and said cartridge chamber, and said rotor rotating about an axis that is coaxial with the longitudinal axis of said one of said spool chamber and said cartridge chamber.

24. A camera according to claim 23, wherein said ultrasonic driving motor is located adjacent to one end of said spool chamber and said rotor rotates about an axis that is coaxial with the longitudinal axis of said spool chamber.

25. A camera according to claim 23, wherein said ultrasonic driving motor is located adjacent to one end of said cartridge chamber and said rotor rotates about an axis that is coaxial with the longitudinal axis of said cartridge chamber.

26. A camera according to claim 23, further comprising a movable mirror in said camera, said ultrasonic driving motor also being linked to said movable mirror to drive said movable mirror.

27. A camera comprising:

a cartridge chamber;

a flat driving motor coupled to at least one of a mirror device that drives a mirror in said camera during exposure of film in said camera and a shutter device that regulates an exposure time interval of the film in said camera, said flat driving motor being located adjacent to one end of said cartridge chamber and including a rotor that rotates about an axis that is coaxial with a longitudinal axis of said cartridge chamber, said rotor having a hole through a central portion thereof;

a second driving motor; and a transmission mechanism coupled to said second driving motor to transmit driving power from said second driving motor to a spindle of said cartridge chamber, wherein a portion of said transmission mechanism is positioned within said hole through said central portion of said rotor.

28. A camera according to claim 27, wherein said flat driving motor is an ultrasonic motor comprising:

a fixed element having an elastic member and a piezoelectric element attached to said elastic member; and said rotor, which contacts said fixed element.

* * * * *